(12) United States Patent
Dennerlein et al.

(10) Patent No.: US 12,299,779 B2
(45) Date of Patent: May 13, 2025

(54) IMAGE QUALITY IN TRANSMISSION X-RAY IMAGING

(71) Applicant: Siemens Healthcare GmbH, Erlangen (DE)

(72) Inventors: Frank Dennerlein, Forchheim (DE); Nicole Maass, Heroldsbach (DE)

(73) Assignee: Siemens Healthineers AG, Forchheim (DE)

( * ) Notice: Subject to any disclaimer, the term of this patent is extended or adjusted under 35 U.S.C. 154(b) by 466 days.

(21) Appl. No.: 17/557,145

(22) Filed: Dec. 21, 2021

(65) Prior Publication Data
US 2022/0207793 A1  Jun. 30, 2022

(30) Foreign Application Priority Data

Dec. 30, 2020 (DE) .................... 10 2020 216 605.6
Jan. 21, 2021 (DE) .................... 10 2021 200 515.2

(51) Int. Cl.
*G06T 11/00* (2006.01)
*G06T 5/77* (2024.01)

(52) U.S. Cl.
CPC .............. *G06T 11/005* (2013.01); *G06T 5/77* (2024.01); *G06T 11/006* (2013.01); *G06T 2207/10081* (2013.01)

(58) Field of Classification Search
CPC ....... G06T 11/005; G06T 5/77; G06T 11/006; G06T 2207/10081; G06T 11/008
See application file for complete search history.

(56) References Cited

U.S. PATENT DOCUMENTS

2012/0301004 A1\* 11/2012 Kingston .............. G01N 23/046
                                                                  382/131
2014/0211925 A1     7/2014 Dong et al.
2018/0315223 A1\* 11/2018 Vija ......................... G06T 7/11

FOREIGN PATENT DOCUMENTS

DE    102013200329 B4    11/2014
DE    102020213678 A1     5/2022

OTHER PUBLICATIONS

Kyriakou Y. et al.: "Simultaneous misalignment correction for approximate circular cone-beam computed tomography", in: Physics in Medicine and Biology, vol. 53, 2008, pp. 6267-6289, doi: 10.1088/0031-9155/53/22/001; 2008;.

(Continued)

*Primary Examiner* — Jianxun Yang
(74) *Attorney, Agent, or Firm* — Harness, Dickey & Pierce, P.L.C.

(57) ABSTRACT

A computer-implemented method is for creating a corrected volume data set representing an examination object. In an embodiment, the method includes providing an initial volume data set based on unknown projection data sets which were acquired via a transmission X-ray imaging system in unknown real mapping geometry; specifying virtual mapping geometry for the initial volume data set; generating virtual projection data sets based on the initial volume data set and the specified virtual mapping geometry; generating corrected mapping geometry based on the plurality of virtual projection data sets; and generating the corrected volume data set based on the virtual projection data sets and the corrected mapping geometry.

19 Claims, 2 Drawing Sheets

(56) References Cited

OTHER PUBLICATIONS

Dennerlein F. et. al., "Geometric Jitter Compensation in Cone-beam CT through Registration of Directly and Indirectly Filtered Projections", In: 2012 IEEE Nuclear Science Symposium and Medical Imaging Conference Record (NSS/MIC), p. 2892-2895, 2012.

Defrise, M. et. al., "A Cone-Beam Reconstruction Algorithm Using Shift-Variant Filtering and Cone-Beam Backprojection", IEEE Transactions on Medical Imaging, vol. 13 No. 1, 1994.

Aichert et al., "Redundancies in X-ray images due to the epipolar geometry for transmission imaging", The third international conference on image formation in X-ray computed tomography, pp. 333-337.

Panetta, D. et. al., "An optimization-based method for geometrical calibration in cone-beam CT without dedicated phantoms," Phys. Med. Biol., 2008, 53, 3841-3861.

Maass, N. et. al., "Geometrical Jitter Correction in Computed Tomography", In: CT-Meeting, pp. 338-342, 2014.

Katsevich A. et al., "A novel motion estimation algorithm", In: The second international conference on image formation in X-ray computed tomography, p. 326-329, 2012.

Kingston, A. et. al., "Reliable automatic alignment of tomographic projection data by passive auto-focus", Medical Physics, 38, 4934-4945, 2011.

* cited by examiner

IMAGE QUALITY IN TRANSMISSION X-RAY IMAGING

PRIORITY STATEMENT

The present application hereby claims priority under 35 U.S.C. § 119 to German patent application numbers DE 102020216605.6 filed Dec. 30, 2020, and DE 102021200515.2 filed Jan. 21, 2021, the entire contents of each of which are hereby incorporated herein by reference.

FIELD

Example embodiments of the invention generally relate the field of transmission imaging and relates in particular to a method for creating a corrected volume data set representing an examination object, an apparatus for creating a corrected volume data set, an imaging system, computer program products and computer-readable storage media.

BACKGROUND

Transmission imaging is used to create a transmission image of an examination object. It can be utilized in medical imaging but also for non-medical purposes, such as industrial materials testing. In transmission imaging, radiation is passed through an object to be examined and then impinges on a 2D detector. Computed tomography or conventional radiography are two examples of transmission imaging. In both cases, an X-ray source is used as the radiation source which emits X-rays of an adjustable X-ray energy spectrum in the direction of the examination object. The 2D detector aligned with the X-ray source acquires the degree by which the radiation has been altered, in particular attenuated, by the object to be examined. The X-rays leave the X-ray source in the form of a cone beam or a fan beam corresponding to a greatly flattened cone, for example. In transmission imaging, 2D/two-dimensional transmission images (for example, in radiography) or 3D/three-dimensional transmission images (for example, in computed tomography) of the examination object can be created. A 2D transmission image is created when the examination object is irradiated from a specific viewing angle/specific viewing direction/specific perspective. A 2D transmission image, also called projection/projection images corresponds to a direction-specific (X-ray) attenuation profile of the examination object. A 3D transmission image additionally comprises depth information relating to the examination object, in particular a spatial density distribution of tissue or material. To generate a 3D transmission image, it is necessary to acquire a plurality of projections of the examination object from different viewing angles and to reconstruct a 3D transmission image, also called a 3D volume, therefrom. The plurality of projections is typically acquired while the examination object and the X-ray source-2D detector pair move relative to one another, as a result of which the viewing direction of each projection is different.

In cone-beam computed tomography, for example, a set of 2D X-ray projections of an examination object is converted into a 3D volume via reconstruction algorithms known per se, wherein the 3D volume represents the spatial density distribution of the examination object. In order to perform object reconstruction, in addition to the projection images, it is necessary to have information on the cone beam geometry or projection recording geometry applied during the image acquisition.

If the geometry information is missing or incorrect, exact 3D reconstruction from the projections is not possible. Here, even minor geometric inaccuracies lead to image artifacts and blurred volume data, which can severely impair later diagnosis or image analysis.

Discrepancies between actual real mapping geometry and assumed theoretical mapping geometry can never be completely excluded due to statistical fluctuations of the parts or functions of the components of the imaging system or movement of the examination object during image data acquisition. In particular, they can be caused by increased degrees of freedom of movement of the imaging system, such as is the case, for example, with open systems that can be used flexibly because they save space. These preferably comprise a C-arm with a robotic arm on which the X-ray source and 2D detector are arranged opposite one another, which can, for example, be particularly advantageous in medical interventions or industrial materials testing.

To date, there have been different ways of addressing the problem of discrepancies between real and perfect/theoretical mapping geometry:

If the information on the theoretical geometry of the imaging system is known (for example, from the accompanying manual or a technical specification or in the form of a system output parallel to the acquired 2D projections), correction methods can be applied to the mapping geometry information prior to 3D reconstruction. The aim of such correction methods is to adapt the known theoretical mapping geometry information so that it better represents the actual real mapping geometry of the projection images. This fine-tuning can correct global misalignments (for example a slight, but unknown detector tilt) or local geometric fluctuations (for example, caused by vibrations of the object or the system). Modern methods for fine-tuning are, for example, described in the German Patent DE 102013200329 B4 or in KYRIAKOU Y. ET AL.: "Simultaneous misalignment correction for approximate circular cone-beam computed tomography", in: Physics in Medicine and Biology, Vol. 53, 2008, pp. 6267-6289, doi:10.1088/0031-9155/53/22/001 and are based on numerical optimization of a cost function that includes a projection data consistency condition. The fine-tuned mapping geometry is then used in the reconstruction of the 3D object volume from the projection data.

If only a reconstructed 3D volume is available, but not the underlying projections and/or the associated theoretical mapping geometry, for example because the system does not allow their output or they were not archived together with the 3D volume, it is not possible to apply the aforementioned correction methods to improve image quality.

In order to improve the quality of a reconstructed 3D volume, it is instead possible to take the following measures that are aimed at minimizing discrepancies between actual and theoretical mapping geometry during projection data acquisition:

more stable anchoring of the system, for example by granite bases, in order to minimize shocks, vibrations, etc.;

stabilization of the temperature of the system and the X-ray tube in order to avoid non-reproducible thermal effects on the mapping geometry;

more frequent geometry calibration in order to keep the mapping geometry up-to-date;

the use of precise system components, such as mechanical axes, joints, arms, motors, sensors or regular replacement;

high level of user training/experience for optimal placement of the object in a manner that is not susceptible to errors;

in the case of veterinary applications: imaging of anesthetized or dead animals in order to avoid cardiac or respiratory motion.

SUMMARY

However, the inventors have discovered that the above measures are associated with high overheads with respect to costs, materials and/or time or are only applicable to a limited extent. In any case, the inventors have discovered that they have to be implemented before or during projection data acquisition and have an influence thereupon. Moreover, the inventors have discovered that some of the measures are in conflict with increasing customer interest in flexible easy-to-use imaging systems.

Hence, the inventors have discovered that it is likewise not possible to optimize the quality of volume data that has already been acquired and archived.

In contrast, at least one embodiment of the present invention provides alternative devices/methods that enable image errors in a 3D volume based on discrepancies between actual and theoretical mapping geometry to be minimized without knowledge of theoretical/perfect mapping geometry. In particular, at least one embodiment of the present invention provides devices/methods for this purpose that can dispense with mechanical and/or functional system adaptations.

Embodiments of the invention are directed to a method for creating a corrected volume data set representing an examination object, a corresponding apparatus, imaging system, computer program and computer-readable data carrier according to the claims. Preferred and/or alternative advantageous variants are the subject matter of the claims.

The following describes the achievement of embodiments of the invention with reference to the method and with reference to the apparatuses. Features, advantages or alternative embodiments mentioned herein can also be transferred to the other subject matter and vice versa. In other words, substantive claims (directed, for example, at a method) can also be developed with features which are described or claimed in connection with one of the apparatuses. Herein, the corresponding functional features of the method are embodied by corresponding substantive modules or units.

In a first embodiment, the present invention relates to a method for creating a corrected volume data set representing an examination object, the method comprising:

providing an initial volume data set based on unknown projection data sets acquired via a transmission X-ray imaging system in unknown real mapping geometry;

specifying virtual mapping geometry for the initial volume data set;

generating a plurality of virtual projection data sets based on the initial volume data set and the virtual mapping geometry specified;

generating corrected mapping geometry based on the plurality of virtual projection data sets; and generating the corrected volume data set based on the plurality of virtual projection data sets and the mapping geometry corrected.

In a further embodiment, the present invention relates to an apparatus for creating a corrected volume data set representing an examination object.

In an embodiment, the corrected volume data set is based on an initial volume data set. This is based on unknown projection data sets acquired via a transmission X-ray imaging system in unknown real mapping geometry. The apparatus comprises a data interface. This is embodied to receive the initial volume data set. The apparatus further comprises a data processing unit embodied to specify virtual mapping geometry for the initial volume data set, to generate virtual projection data sets based on the initial volume data set and the specified virtual mapping geometry, to generate corrected mapping geometry based on the plurality of virtual projection data sets, and to generate the corrected volume data set based on the virtual projection data sets and parameters of the corrected mapping geometry.

In a further embodiment, the invention provides an imaging system with an apparatus according to an embodiment of the invention for creating a corrected volume data set of an examination object. Herein, in some variants, the imaging system can be embodied as a medical system, veterinary medical system, industrial computed tomography system, mammography system or industrial transmission X-ray imaging system or the like or in each case as the imaging part thereof. Advantageously, the apparatus according to the invention is integrated into the imaging system. Alternatively, the apparatus can also be arranged remotely or separately. The apparatus can in particular be embodied to carry out the method according to the invention for an imaging system or for a plurality of systems.

In a further embodiment, the invention further relates to a computer program with program code for carrying out the method according to an embodiment of the invention for creating a corrected volume data set representing an examination object when the computer program is executed on a computer.

In a further embodiment, the invention further relates to a computer-readable data carrier with program code of a computer program for executing the method according to an embodiment of the invention for creating a corrected volume data set representing an examination object when the computer program is executed on a computer, in particular the data processing unit.

The computer program product is, for example, stored on a computer-readable storage medium or held on a network or server from where it can be loaded into the processor of the respective data processing unit. The server, memory or network can be directly connected to the data processing unit or embodied as part of the same. Furthermore, control information of the computer program product can be stored on a computer-readable storage medium. The control information of the computer-readable storage medium can be embodied to carry out a method according to an embodiment of the invention when the data carrier is used in a data processing unit. Examples of computer-readable storage media are DVD, a magnetic tape or a USB stick on which electronically readable control information, in particular software, is stored. When this control information is read from the data carrier and stored in a data processing unit, all the embodiments according to the invention of the above-described methods can be carried out. Thus, the invention can also be based on the computer-readable medium and/or the computer-readable storage medium. The advantages of the suggested computer program product or the associated computer-readable media substantially correspond to the advantages of the suggested method.

In a further embodiment, the invention further relates to a computer-implemented method for creating a corrected volume data set representing an examination object, the computer-implemented method comprising:

providing an initial volume data set based on unknown projection data sets acquired via a transmission X-ray imaging system in unknown real mapping geometry;

specifying virtual mapping geometry for the initial volume data set;

generating a plurality of virtual projection data sets based on the initial volume data set and the virtual mapping geometry specified;

generating corrected mapping geometry based on the plurality of virtual projection data sets; and generating the corrected volume data set based on the plurality of virtual projection data sets and the corrected mapping geometry.

In a further embodiment, the invention further relates to an apparatus for creating a corrected volume data set representing an examination object based on an initial volume data set based on unknown projection data sets acquired via a transmission X-ray imaging system in unknown real mapping geometry, the apparatus comprising:

a data interface embodied to receive the initial volume data set; and a data processing unit embodied to
specify virtual mapping geometry for the initial volume data set;
generate a plurality of virtual projection data sets based on the initial volume data set and the virtual mapping geometry specified,
generate corrected mapping geometry based on the plurality of virtual projection data sets, and
generate the corrected volume data set based on the plurality of virtual projection data sets and the corrected mapping geometry.

In a further embodiment, the invention further relates to an imaging system comprising:

the apparatus for creating a corrected volume data set of an embodiment.

In a further embodiment, the invention further relates to a non-transitory computer program product, storing a program, directly loadable into a memory of a programmable computing unit of a data processing unit, including program code for executing the method of an embodiment when the program is executed in the data processing unit.

In a further embodiment, the invention further relates to a non-transitory computer-readable storage medium storing readable and executable program sections for executing the method of an embodiment when the program sections are executed by the data processing unit.

BRIEF DESCRIPTION OF THE DRAWINGS

The above-described properties, features and advantages of this invention and the manner in which these are achieved will become clearer and more plainly comprehensible in conjunction with the following description of the example embodiments explained in more detail in conjunction with the drawings. This description does not restrict the invention to these example embodiments. The same components are given identical reference symbols in the different figures. The figures are not generally true to scale. The figures show.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In a first embodiment, the present invention relates to a method for creating a corrected volume data set representing an examination object. The method comprises a plurality of steps.

The method is a computer-implemented method.

A first step is directed at the provision of an initial volume data set. This initial volume data set is based on unknown projection data sets acquired via a transmission X-ray imaging system in unknown real mapping geometry.

Consequently, the method according to an embodiment of the invention only knows the initial volume data set. There is no access to the raw data of the imaging system, in particular no access to the actual mapping geometry or to the projection data sets acquired therewith.

The initial volume data set has mapping errors that result from a discrepancy between theoretical and actual mapping geometry and are represented, for example, as blurring and/or edge inaccuracies of mapped objects or substructures, for example organs. These are to be minimized or eliminated according to the invention.

The volume data set is a fully reconstructed three-dimensional data set that maps at least a partial, preferably a complete, examination object. More specifically, the volume data set describes a spatial density distribution of the tissue/material of the examination object in the mapped part. The volume data set can, for example, be provided from an archive, a memory or directly from an imaging system via corresponding data links or interfaces.

The inventors have recognized that the lack of actual mapping geometry can be overcome. Accordingly, a further step is directed at the specification of virtual mapping geometry for the initial volume data set. On the one hand, the virtual mapping geometry can be specified in that a user manually inputs settings for the virtual mapping geometry via corresponding data interfaces/an input unit, which settings are then provided to a data processing unit. Alternatively, the virtual mapping geometry can be specified automatically by the data processing unit. In both variants, the specification or selection of the virtual mapping geometry advantageously takes account of the examination object mapped in the volume data set. Alternatively and/or additionally, the selection of the virtual mapping geometry can take account of the imaging system used to create the volume data set.

Ideally, the virtual mapping geometry specified in this way characterizes or approximates a theoretical perfect mapping geometry.

A further step relates to the generation of virtual projection data sets based on the initial volume data set and the specified virtual mapping geometry.

The virtual projection data sets generated in this way replace the missing real projection data sets on which the volume data set is based. The virtual projection data sets each represent an X-ray absorption profile of the examination object for a specific projection direction or projection area. A projection data set substantially determines (neglecting multiple scattering or the like) for the plurality of individual rays of a cone-shaped or fan-shaped X-ray beam the proportion of the original X-ray intensity that has passed through the examination object.

In a further step, corrected mapping geometry is generated based on the plurality of virtual projection data sets. In other words, the virtual projection data sets are now used to apply an error correction method which supplies corrected mapping geometry as a result. In some embodiments, the corrected mapping geometry approximates the actual unknown mapping geometry. The error correction method used is preferably a correction method that is known per se, which is typically applied to real projection data sets with geometrically induced mapping errors prior to 3D reconstruction.

By creating virtual projection data sets via virtual mapping geometry, the present invention enables these correction methods to be used for the present application.

In a further step, the corrected volume data set is generated based on the virtual projection data sets and the corrected mapping geometry, in particular the parameters of the corrected mapping geometry. The corrected volume data set corresponds to the initial volume data set and has reduced mapping errors caused by geometric discrepancies during image data acquisition. The corrected volume data set is generated by a transmission X-ray imaging reconstruction method that is known per se, for example filtered back projection or the like. During reconstruction, the virtual projection data sets are back-projected according to parameters of the corrected mapping geometry.

At least one embodiment of the present invention has the effect of improving image quality, in particular sharpness and edge accuracy, of a volume data set, wherein the degradation of the image quality is based on discrepancies between actual and theoretical mapping geometry information, although there is no access to the associated raw data of the imaging system (projection data sets/mapping geometry). The suggested method is based on an algorithmic approach and permits a software-only implementation.

The examination object is a patient, typically a person. The patient can also be an animal. Alternatively, the examination object can be a plant or a non-living object, for example an industrially manufactured workpiece or another object, for example an item of baggage. In this respect, the invention can be used in a wide variety of imaging applications.

In a preferred embodiment of the method, the specification of the virtual mapping geometry comprises determining a value for each of a plurality of geometric parameters of the virtual mapping geometry.

Mapping geometry or recording geometry, regardless of whether it is real, actual, perfect, theoretical or virtual, typically comprises a plurality of geometric parameters.

Herein, virtual mapping geometry within the meaning of the invention should be understood as being the set or sum of the geometric parameters provided and applied for virtual image data acquisition of the virtual projection data sets via the transmission X-ray imaging system. Consequently, the virtual mapping geometry characterizes a plurality of virtual device settings or technical device features for virtual image data acquisition, here, the virtual projection data sets.

In some embodiments of the present invention, the at least one geometric parameter is consequently a parameter characterizing a virtual relative position between an X-ray source of the imaging system and the examination object, characterizing a virtual magnification of the imaging system and/or a virtual spatial resolution or characterizing a number of virtual projection data sets.

In some embodiments, a plurality of the specifically mentioned parameters can be combined together in a function that maps the specifically mentioned parameters to further parameters without any specific geometric significance. In some embodiments, therefore, the at least one geometric parameter is embodied as a function of at least one of the geometric parameters.

As mentioned in the introduction, in the case of real image data acquisition, the relative position between the examination object and the X-ray source-X-ray detector pair is preferably changed several times for generating a plurality of real X-ray projection data sets. Herein, the relative position can be changed by moving the examination object or the emitter-detector pair. The movement can in particular comprise a rotational or translational movement. Therefore, at least one geometric parameter of the virtual mapping geometry can be a parameter characterizing a virtual relative position between an X-ray source of the imaging system and the examination object, for example from the group comprising the following parameters:

axis of rotation: describes the axis relative to a reference coordinate system about which the examination object or emitter-detector pair is rotated during image data acquisition. Alternatively, the circular arc trajectory can also be described provided that the X-ray source/X-ray detector are moving.

line trajectory: describes the axis relative to a reference coordinate system along which the examination object or the emitter-detector pair is displaced during image data acquisition.

angle X-ray emitter-axis of rotation and/or angle X-ray detector axis of rotation: preferably describes an angle enclosed between a central ray of the X-ray beam and the axis of rotation. This can, for example, assume a value of 90°, but also deviate therefrom, for example if specific structures of the examination object are to be particularly exposed.

Furthermore, at least one geometric parameter can be a parameter characterizing a virtual magnification or a spatial resolution of the imaging system, in particular from the group comprising the following parameters:

distance examination object-X-ray emitter,
distance examination object-X-ray detector,
distance X-ray emitter-X-ray detector,
detector pixel size,
detector pixel number,
detector pixel shape.

At least one geometric parameter can be a parameter characterizing a number of virtual projection data sets. The number of virtual projection data sets largely depends on the examination object or internal structures to be investigated. Herein, the number of virtual projection data sets can vary between a few and many thousands. For example, 25 projections can be provided for a mammography examination of breast tissue, but 200 to 300 projections for a dental examination. Consequently, the parameter can be a parameter from the group comprising the following parameters:

angular increment: describes the angular range that is stepped during a rotational movement about an axis of rotation and for which projection data sets are generated. The angular increment can assume values of between 180° and 360°.

number of projection angles: describes how many projection data sets are acquired for a defined angular increment. Alternatively, it is also possible to define the step size between recording positions typically arranged equidistantly.

number of recording positions: describes how many projection data sets are recorded over a defined line trajectory. Alternatively, it is also possible to define the step size between recording positions typically arranged equidistantly.

cone beam angle or also fan beam angle: describes the angle covered by the X-ray beam.

There are different forms of representation for the mapping geometry each of which is common, equal and can also be transferred into another one. It is possible for the mapping geometry to be represented by projection matrices. A projection matrix describes the mapping rule for an object point of the three-dimensional object space X into a respective image plane or projection plane.

In general, therefore, virtual mapping geometry to be specified according to at least one embodiment of the invention also comprises the following set of geometric parameters:

a. number of images/projection data sets recorded;
b. number of detector pixels in both dimensions x and y of the projection plane or image plane (corresponding to that of the size of the individual projection data sets);
c. there are 12 further parameters for each projection data set, namely the relative 3D positions of the examination object, 2D detector and X-ray source and the arrangement of the detector pixels (corresponding to their size and position in space). Thus, 3 parameters each result from the relative position of the 2D detector to the examination object and from the relative position of the X-ray source to the examination object. A further 6 parameters result from the arrangement of the detector pixels in space comprising a parameter for the size of the detector pixels. These 12 geometric parameters can be represented by the projection matrices, in each case comprising 3×4 entries, i.e., 12 numbers.

The specification of the virtual mapping geometry consequently comprises the determination of a value and/or a function for each geometric parameter of the plurality of geometric parameters of the virtual mapping geometry.

The value of an individual geometric parameter can now be determined in various ways according to the invention. The at least one value can be determined automatically, manually or in an at least partially automated manner. In particular, mixed forms can also occur, i.e., different geometric parameters of the virtual mapping geometry can be determined in different ways.

In some embodiments of the invention, a value for at least one geometric parameter of the virtual mapping geometry is determined based on the initial volume data set.

Therefore, a value for a single geometric parameter of the virtual mapping geometry is specified by evaluating image information contained in the initial volume data set and deriving a corresponding parameter value. For example, a user can acquire previously displayed image information visually and make corresponding inputs for one or more individual geometric parameters. Alternatively or additionally, the image information of the volume data set can be evaluated automatically by a data processing unit. The evaluation can comprise object recognition. In particular, (virtual) mapping geometry can differ depending upon the examination object recognized. Taking account of the image contents of the volume data set enables suitable mapping geometry to be found for the examination object, i.e., for example, one or more individual geometric parameters matched to a mapped organ or tissue or material. The object recognition can be based on an image analysis method that is known per se and, for example, comprise (edge-based) segmentation or object classification, organ classification or material classification. The suggested approach exploits the fact that different mapping geometries or associated parameter values are applied depending upon the examination object or tissue or material under examination. This approach is in particular aimed at the specification of the number of projections of the virtual mapping geometry.

In further embodiments of the invention, a value for at least one geometric parameter of the virtual mapping geometry is determined under the assumption of complete mapping of the examination object with the virtual mapping geometry. In other words, here, the value of at least one geometric parameter of the virtual mapping geometry is selected such that the acquisition of all X-rays that pass through the examination object and could interact therewith is enabled. This approach is in particular aimed at the determination of the parameter values for the pixel size and/or the distance between the examination object and the 2D detector. If neither the pixel size nor the optical magnification of the imaging system is known, values for the two geometric parameters can be selected such that the examination object is completely mapped on the 2D detector.

In further embodiments of the invention, a value for at least one geometric parameter of the virtual mapping geometry is determined based on a technical specification of the medical imaging system.

For example, values for geometric parameters of the medical imaging system with which the initial volume data set was generated can be known or stored retrievably for data processing. These parameter values can now be set for corresponding parameters of the virtual mapping geometry. For example, the values of parameters of the medical imaging system can be known for this purpose from a digital or analog manual and transferred to the virtual mapping geometry. Alternatively, a value for a geometric parameter of the virtual mapping geometry can be determined, or at least approximately estimated, by a user by visually inspecting the imaging system and then specified by corresponding user input.

For example, the number of detector pixels for an imaging system can always be set to be identical, i.e., regardless of the initial volume data set, since the 2D detector is typically not changed. The value is usually obtained from the data sheet. If this knowledge about the recording device is not available, the number of detector pixels can simply be set equal to the volume dimension and thus a good, because it is realistic, estimated value can be set for this geometric parameter. The number of projections is, for example, obtained according to a high-quality mode and a fast mode of the imaging system, which differ inter alia in different projection numbers. This information can usually be found in a data sheet for the system. If the exact value of the number of projections is not available, the number of detector pixels in width corresponding to the volume dimension (x-direction) can serve as a good estimated value. If, for example a volume slice comprises 1000×1000 pixels, the detector width can be set at 1000 pixels. In the case of non-square volume slices, the larger of the two volume dimensions is selected. In the case of a volume slice with 1117×789 pixels, the detector width would be selected as 1117 pixels. In the case of a volume with, for example, 473 slices, a detector height of 473 would be set.

If there is no technical specification for the imaging system or if it cannot be directly inspected, basic estimated values can be specified for the parameter values. If, for example the orientation of the detector pixels in space (values for 6 geometric parameters) is unknown, this can be determined by assuming a square pixel shape and that the extension of the connecting line from the X-ray source to the examination object intersects the detector pixels perpendicularly. If, for example, during image data acquisition, the individual positions of the X-ray source are unknown but it is known that the imaging system has traveled a circular trajectory, the positions of the X-ray source and detector on opposite sides of the examination object are distributed at equidistant angular distances. The number of projections can either be estimated in advance or, as described above, determined based on the initial volume data set. If the distances X-ray source-examination object, examination object-2D detector are unknown they can, for example, be specified under the assumption of complete mapping of the examination object, as described in the introduction, or a default setting of, for example, 1 m (or in individual cases 10 m) can be set.

In summary, as described, the virtual mapping geometry can advantageously be approximated as closely as possible to real actual mapping geometry. If real mapping geometry is not known, logical empirical values ("educated guess") can be set as values in the sense of default settings.

In a further embodiment of the present invention, the generation of the virtual projection data sets comprises projecting the initial volume data set according to the virtual mapping geometry. Therefore, the virtual mapping geometry is used to re-project the examination object mapped with the initial volume data set according to the virtual mapping geometry. Therefore, image data acquisition is simulated with the specified virtual parameterization. Here, several, i.e., a plurality of, virtual projection data sets are generated. Herein, each of the projection data sets corresponds to a specific projection direction or a specific projection area. The set of projection data sets corresponds to the number of projections specified in advance. A few to thousands of virtual projection data sets can be generated. The exact number, their position in relation to one another, their resolution, etc. depends on the specified virtual mapping geometry.

In a further embodiment of the present invention, the generation of the corrected mapping geometry comprises applying at least one cost function based, for example, on a consistency condition to the virtual projection data sets and the virtual mapping geometry. This approach exploits the presence of data redundancies in the virtual projection data sets or their 3D Radon transforms. In other words, consistency conditions can be derived based on the virtual projection data sets. A consistency condition can relate to a global data consistency or a local data consistency. The assumption is that inconsistencies in data can be attributed to a misalignment or discrepancy between actual and perfect mapping geometry. These discrepancies result in an increase in the value of the cost function. The application of the cost function comprises the optimization thereof while adapting at least one, preferably a plurality, of the geometric parameters of the virtual mapping geometry. Optimization comprises searching for or approximating a minimum of the cost function or approximating the value 0. Finding the functional minimum simultaneously corresponds to finding or ascertaining the corrected mapping geometry. Herein, the cost function can preferably be applied iteratively with respect to the value of one geometric parameter and/or iteratively with respect to the plurality of geometric parameters for which the functional minimum is sought. Herein, each of the iteration loops can be terminated after a previously specified number of runs or when the cost function falls below a previously specified value.

In alternative embodiments of the invention, the cost function can, for example, also be based on a measure of image sharpness. However, these functions have comparatively high computing overheads, since each evaluation of the cost function requires the reconstruction of a volume (or partial volume) in order to be able to quantify the quality of this (partial) volume.

Therefore, to optimize the recording geometry based upon the cost function, a subset of geometric parameters of the virtual mapping geometry is determined. The subset comprises at least one geometric parameter, but preferably a plurality of or all geometric parameters. The optimization now comprises the calculation of the cost function for a plurality of modified values of the at least one geometric parameter until the minimum of the cost function or a previously specified termination criterion is reached. The value of the at least one geometric parameter that leads to a minimum of the cost function and/or with which the termination criterion is reached is then set according to the invention as the value of the at least one geometric parameter of the corrected mapping geometry.

In some embodiments of the invention, the selection of the at least one geometric parameter used for optimization can be performed manually by a user or automatically in the context of data processing. According to the invention, the selection can advantageously be based on the following considerations/assumptions:

a. Which consistency condition is being used and which geometric parameters does this allow for optimization? Not every consistency condition is suitable for optimizing any geometric parameter. Some consistency conditions hardly "react" to specified geometric parameters.

b. How accurately or how reliably is a specific geometric parameter known? The mechanical construction of the device for recording X-ray projections typically results in different uncertainties for the different geometric parameters.

c. What is the relevance of a specific geometric parameter for image quality? There are parameters that, for example, when changed by a factor of 2 (halving or doubling) have no noticeable effect in the respective reconstructed 3D volume. Such parameters do not even have to be measured more precisely when determining the virtual mapping geometry; it is sufficient for them to be estimated by visually inspecting the imaging system. Alternatively, there are parameters that may only deviate very slightly (for example, less than 0.1 per thousand) from their optimal value in order to obtain a 3D volume that is at all usable. These parameters are in particular candidates for optimization according to the invention.

d. Practical experience of the user with the imaging system: If, for example, the optimization of two specific geometric parameters has provided good results for previous initial volume data sets, these parameters are preferably also selected for further volume data sets.

In particular, it is possible to apply the methods or the cost functions derived therefrom described in the German patent specification DE 102013200329 B4 or in AICHERT et al., "Redundancies in X-ray images due to the epipolar geometry for transmission imaging", The third international conference on image formation in X-ray computed tomography, pp. 333-337 or in MAASS, N. ET. AL., "Geometrical Jitter Correction in Computed Tomography", In: CT-Meeting, pp. 338-342, 2014, the entire contents of each of which are hereby incorporated herein by reference.

In a further embodiment of the present invention, the generation of the corrected volume data set comprises back-projecting the virtual projection data sets according to the corrected mapping geometry. This step relates to the reconstruction of the corrected volume data set according to the corrected mapping geometry. The reconstruction process can comprise filtered back projection (FBP), preferably an FDK (Feldkamp-Davis-Kress) algorithm which is in particular suitable for the reconstruction of projection data sets acquired via cone beam geometry. The reconstruction process can further comprise an iterative reconstruction rule, in particular an iterative reconstruction rule that applies filtering.

In a further embodiment, the present invention relates to an apparatus for creating a corrected volume data set representing an examination object. Herein, the corrected volume data set is based on an initial volume data set. This is based on unknown projection data sets acquired via a transmission X-ray imaging system in unknown real mapping geometry. The apparatus comprises a data interface. This is embodied to receive the initial volume data set. The apparatus further comprises a data processing unit embodied to specify virtual mapping geometry for the initial volume data set, to generate virtual projection data sets based on the initial volume data set and the specified virtual mapping geometry, to generate corrected mapping geometry based on the plurality of virtual projection data sets, and to generate the corrected volume data set based on the virtual projection data sets and parameters of the corrected mapping geometry.

The data processing unit can be embodied as a central or decentralized computing unit or computer. The computing unit can have one or more processors. The processors can be embodied as a central processing unit (CPU) and/or as a graphics processing unit (GPU). Alternatively, the data processing unit can be implemented as a local or cloud-based processing server.

The data interface can be generally embodied for data exchange between the data processing unit and further components. The data interface can be implemented in the form of one or more individual interfaces, which, for example, can have a hardware and/or software interface, for example a PCI bus, a USB interface, a FireWire interface, a ZigBee interface or a Bluetooth interface. The data interface can further have an interface of a communication network, wherein the communication network can have a local area network (LAN), for example an intranet or a wide area network (WAN). Correspondingly, the one or more data interfaces can have a LAN interface or a wireless LAN interface (WLAN or WiFi).

In some embodiments of the invention, the apparatus can have a data memory in data communication with the data interface. The data memory can store one or more initial volume data sets for retrieval. The data memory can be embodied as a local memory of the apparatus, for example as a working memory or hard disk or as a decentralized or central memory, for example a PACS system in a hospital. Furthermore, the data memory can be part of a server system.

In a further embodiment, the invention provides an imaging system with an apparatus according to an embodiment of the invention for creating a corrected volume data set of an examination object. Herein, in some variants, the imaging system can be embodied as a medical system, veterinary medical system, industrial computed tomography system, mammography system or industrial transmission X-ray imaging system or the like or in each case as the imaging part thereof. Advantageously, the apparatus according to the invention is integrated into the imaging system. Alternatively, the apparatus can also be arranged remotely or separately. The apparatus can in particular be embodied to carry out the method according to the invention for an imaging system or for a plurality of systems.

In a further embodiment, the invention further relates to a computer program with program code for carrying out the method according to an embodiment of the invention for creating a corrected volume data set representing an examination object when the computer program is executed on a computer.

In a further embodiment, the invention further relates to a computer-readable data carrier with program code of a computer program for executing the method according to an embodiment of the invention for creating a corrected volume data set representing an examination object when the computer program is executed on a computer, in particular the data processing unit.

A computer program product can comprise software with a source code which still has to be compiled and linked or only has to be interpreted, or an executable software code that only needs to be loaded into a data processing unit for execution. The computer program product can execute the method quickly, identically repeatedly and robustly. The computer program product is configured such that it can execute the method steps according to the invention via the data processing unit. Herein, the data processing unit must in each case fulfill the requisite conditions such as, for example, having an appropriate working memory, an appropriate processor, an appropriate graphics card or an appropriate logic unit so that the respective method steps can be executed efficiently.

The computer program product is, for example, stored on a computer-readable storage medium or held on a network or server from where it can be loaded into the processor of the respective data processing unit. The server, memory or network can be directly connected to the data processing unit or embodied as part of the same. Furthermore, control information of the computer program product can be stored on a computer-readable storage medium. The control information of the computer-readable storage medium can be embodied to carry out a method according to an embodiment of the invention when the data carrier is used in a data processing unit. Examples of computer-readable storage media are DVD, a magnetic tape or a USB stick on which electronically readable control information, in particular software, is stored. When this control information is read from the data carrier and stored in a data processing unit, all the embodiments according to the invention of the above-described methods can be carried out. Thus, the invention can also be based on the computer-readable medium and/or the computer-readable storage medium. The advantages of the suggested computer program product or the associated computer-readable media substantially correspond to the advantages of the suggested method.

Figure 1:
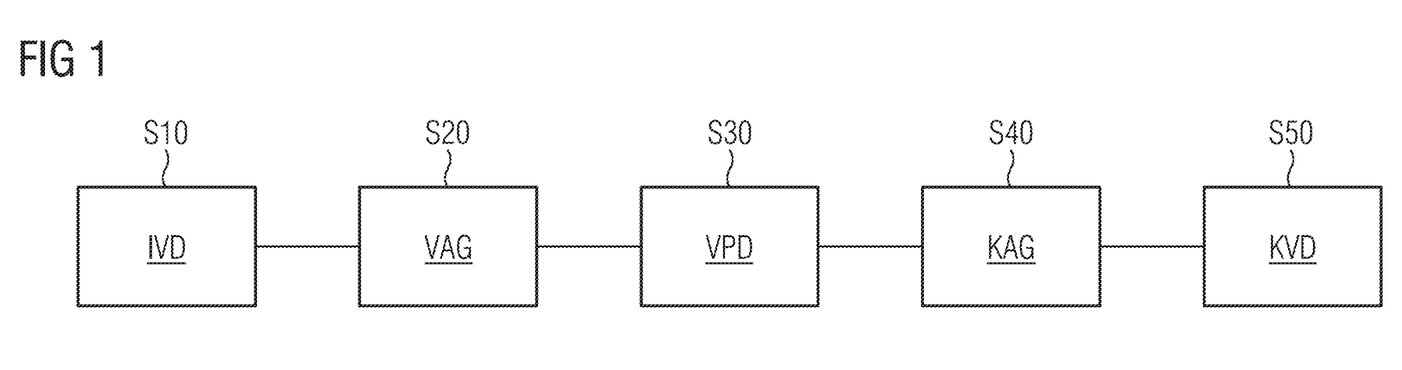
FIG. 1 a schematic representation of a method according to the invention in an example embodiment.

FIG. 1 shows a schematic representation of a method according to the invention in an example embodiment. The method is a computer-implemented method. It is used to create a corrected volume data set KVD representing an examination object 10. The corrected volume data set KVD is characterized by higher image quality. The mapping fidelity, in particular the sharpness and edge accuracy of the corrected volume data set KVD are high. The method comprises a plurality of steps.

Step S10 relates to the provision of an initial volume data set IVD. This is based on unknown projection data sets acquired via a transmission X-ray imaging system 20 in unknown real mapping geometry.

The provision can comprise providing, sending, transmitting to an apparatus 30. The initial volume data set IVD can be stored in a local, central or decentralized storage unit, for example storage unit 60 or 36, from where it is, for example, provided via data interface 32.

Figure 2:
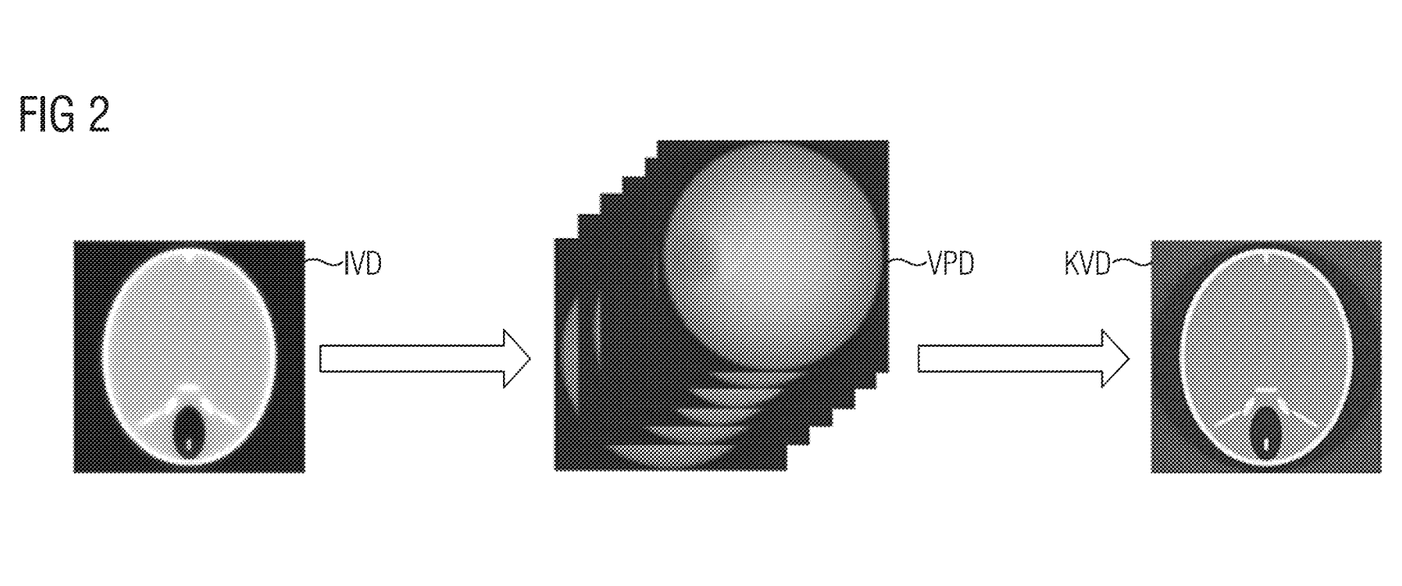
FIG. 2 shows the generation of a corrected volume data set from an initial volume data set with improved edge accuracy and image sharpness, FIG. 3 an apparatus for creating a corrected volume data set according to an embodiment of the present invention, and FIG. 4 a schematic representation of an imaging system in an embodiment of the present invention.

The initial volume data set IVD, as represented in FIG. 2, is a fully reconstructed volume data set of an examination object 10. The method according to the invention is based on a situation in which the raw data of the image data acquisition, i.e., the actual, real projection data sets or the mapping geometry used for the mapping are unknown or not available. The initial volume data set IVD has low mapping quality, in particular reduced edge accuracy and image sharpness. The method according to the invention is further based on the assumption that these mapping errors are attributable to discrepancies between real unknown, mapping geometry and theoretical perfect mapping geometry. For example, the image quality may be due to a minimal detector offset or a non-perfect circular path of a pair consisting of X-ray emitter and 2D detector or vibrations during image data acquisition. According to the method, these image errors are rectified or advantageously reduced, even without knowledge of the raw data.

Step S20 of the method relates to the specification of virtual mapping geometry VAG for the initial volume data set IVD.

The specification comprises the determination of a value for each of the geometric parameters of the virtual mapping geometry VAD, i.e., for all the geometric parameters acquired. A parameter value can be indicated by a specific number but also by a function. Consequently, the virtual mapping geometry VAD comprises a set of geometric parameters that are determined or defined in this step. The parameters can be embodied as location parameters, position parameters, shape parameters, number parameters or the like and can relate to an imaging system 20 and the components thereof such as radiation source 21 or 2D detector 23. The sum of the geometric parameters describes the virtual mapping geometry VAG which is assumed to correspond to perfect theoretical mapping geometry for the examination object 10 represented via the initial volume data set IVD.

According to an embodiment of the invention, the specification of the virtual mapping geometry is based on knowledge of the theoretical perfect recording parameters. This knowledge can be available or obtained in various ways.

According to an embodiment of the invention, the virtual mapping geometry VAG is, for example, specified based on the initial volume data set IVD, either manually by a user or automatically by the data processing unit 34, for example. For manual determination, it can be provided that the initial volume data set IVD is displayed to the user via a user interface, for example comprising a display, for visual appraisal. The user interface, further comprising a keyboard, for example, can then be used to receive selection inputs with respect to the parameterization. Alternatively, an automatic image evaluation method can be applied to the initial volume data set IVD. This can acquire and classify image features. In particular, object recognition comprising, for example, segmentation can be performed on the initial volume data set IVD in order to recognize represented structures, tissues, organs or the like. The recognized image features or recognized objects/organs can then be used for parameterization, i.e., a set of predefined geometric parameters can be selected and/or displayed to the user for selection and/or confirmation.

The virtual mapping geometry VAG can, for example, also be specified based on the assumption of complete mapping of the examined volume via the virtual mapping geometry. Here, it is assumed that the examination object or the examined volume is known. Here, in particular the pixel size and the distance of the examination object from the 2D detector are selected such that the examination object is completely mapped on the detector. Here, once again, the selection can be performed manually by the user or automatically by the data processing unit 34.

The virtual mapping geometry VAG can, for example, also be specified based on a technical specification of the medical imaging system, here, once again, either manually by a user or automatically by the data processing unit 34, for example. For manual determination, it can be provided that the user visually appraises the imaging system and, in this way, ascertains an estimated value for at least one geometric parameter and enters it via the user interface. Alternatively, provided that real geometric parameters of the imaging system are available in the form of an analog data sheet or manual, they may also be ascertained by the user and input via the interface. Alternatively, provided that real geometric parameters of the imaging system are available in the form of a digital data sheet or manual, they may be automatically ascertained, retrieved and made available to the data processing unit 34.

Figure 4:
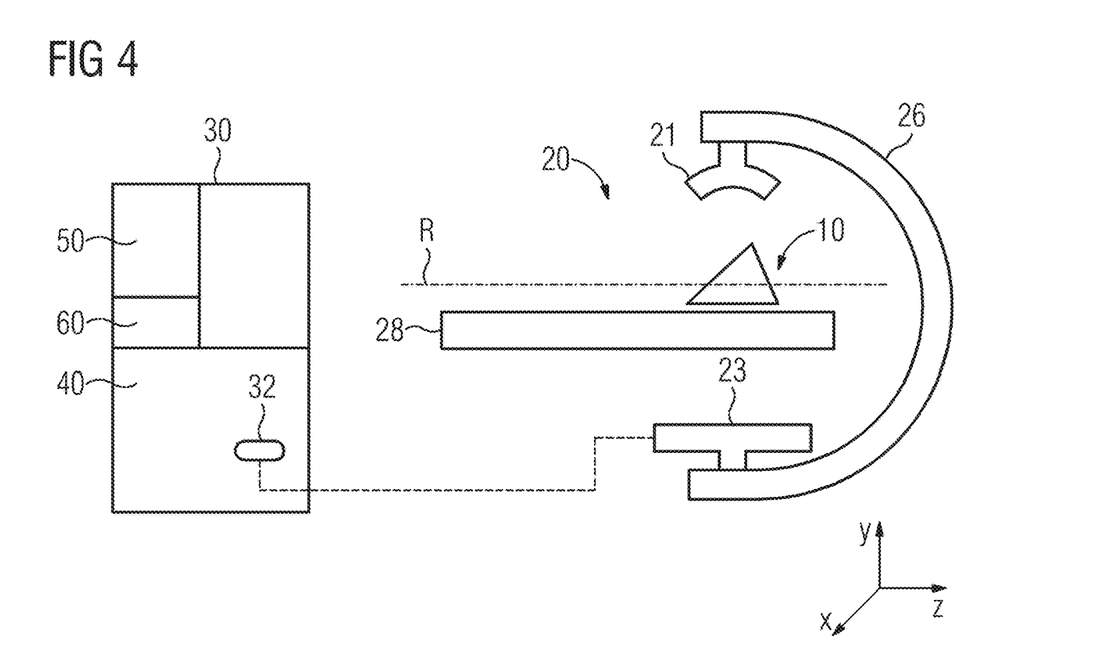

Geometric parameters can be parameters characterizing a virtual relative position between an X-ray source 21 of the imaging system 20 and the examination object 10 from the group comprising the following parameters: axis of rotation R, line trajectory, angle X-ray emitter-axis of rotation, angle X-ray detector-axis of rotation. Geometric parameters can be parameters characterizing a virtual magnification of the imaging system 20 or a virtual spatial resolution from the group comprising the following parameters: distance examination object-X-ray emitter, distance examination object-X-ray detector, distance X-ray emitter-X-ray detector, detector pixel size, detector pixel number, detector pixel shape.

Geometric parameters can further be parameters characterizing a number of virtual projection data sets IVD from the group comprising the following parameters: number of projection angles, number of recording positions, angular increment, cone beam angle.

The list of geometric parameters is not exhaustive.

Step S30 relates to the generation of virtual projection data sets VPD, as represented in FIG. 2, based on the initial volume data set IVD and the specified virtual mapping geometry VAG.

Here, the initial volume data set IVD is projected according to the virtual mapping geometry VAG. In other words, a number of virtual projection profiles or X-ray attenuation profiles that are likewise determined thereby are generated for different projection directions or projection areas defined by the virtual mapping geometry VAG. Herein, the projection corresponds to the reverse operation of (filtered) back projection as applied in the course of image reconstruction from real projection data sets. In the further course of the method, the virtual projection data sets VPD replace the actual real, but unavailable, projection data underlying the initial volume data set IVD Step S40 relates to the generation of corrected mapping geometry KAG based on the plurality of virtual projection data sets VPD.

To derive the corrected mapping geometry KAG, the virtual mapping geometry VAG is adapted or modified based on the virtual projection data sets VPD. In particular, the values or the function of the geometric parameters are adapted or modified.

For this purpose, advantageously, an optimization method can be used which exploits data redundancy in the virtual projection data sets and/or in their Radon transforms. Accordingly, step S40 may comprise the application of at least one cost function based on a consistency condition.

This approach is based on the consideration that discrepancies between redundant object information are based on geometric discrepancies or a misalignment of the imaging system. These geometric discrepancies are compensated with the described approach.

The optimization comprises varying the values of at least one, preferably more, of the geometric parameters of the virtual mapping geometry VAG in order to search for the minimum of the cost function. The optimization of the cost function can preferably be performed iteratively. Herein, the function minimum can first be sought for each geometric parameter individually, then, for the next parameter, etc. The optimization can be terminated after a predetermined number of iteration runs or when a previously defined function value is fallen below. The values of the corrected mapping geometry KAG correspond to the values that led to the achievement of the minimum of the cost function.

Step S50 relates to the generation of the corrected volume data set KVD, as shown in FIG. 2, based on the virtual projection data sets VPD and parameters of the corrected mapping geometry KAG. This is performed using a reconstruction algorithm that is known per se comprising back projection of the virtual projection data sets VPD according to the corrected mapping geometry KAG. This reconstruction algorithm can comprise filtered back projection, such as the FDK algorithm, for example. The reconstruction algorithm can also comprise iterative reconstruction.

FIG. 2 shows how, according to an embodiment of the invention, a corrected volume data set KVD with significantly improved edge accuracy and image sharpness is generated from the initial volume data set IVD.

Figure 3:
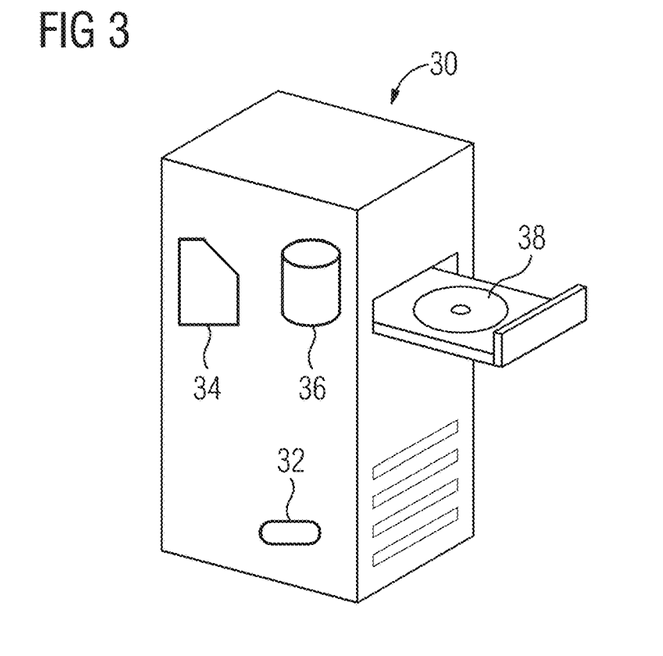

FIG. 3 is a schematic view of an apparatus 30 for creating a corrected volume data set KVD, for example of the examination object 10, based on an initial volume data set IVD, according to an embodiment of the present invention. Herein, the initial volume data set IVD is based on unknown projection data sets acquired via a transmission X-ray imaging system 20 in unknown real mapping geometry.

Here, the apparatus 30 has a data processing unit 34, a data memory 36 and the data interface 32. Here, the apparatus 30 is embodied as a data processing apparatus detached from an imaging system 20. Here, the data interface 32 is embodied to receive an initial three-dimensional volume data set IVD from the data memory 36 and transmit it to the data processing unit 34. In the present case, the data memory 36 is embodied as a subcomponent of the apparatus 30; alternatively, it can be embodied as a separate, for example central, storage unit. The apparatus 30, in particular the data processing unit 34, is configured to execute a method for creating a corrected volume data set KVD representing the examination object 10 based on an initial volume data set IVD according to an embodiment of the present invention and in particular according to an embodiment with respect to FIG. 1.

The data processing unit 34 is further embodied to interact with a computer-readable storage medium 38 in order, in one embodiment, to execute the method according to the invention according to a computer program with program code. The computer program can be stored retrievably on the computer-readable storage medium 38. The computer-readable storage medium 38 can, for example, be embodied as a CD, DVD, Blu-Ray disk, memory stick or hard disk drive.

A computer program comprising program code can alternatively be stored in the data memory 36 of the apparatus 30. The computer program is embodied to execute a method according to an embodiment of the invention with all method steps when the computer program is executed by the apparatus 30, in particular the data processing unit 34.

FIG. 4 shows a schematic representation of an imaging system 20 in one embodiment of the present invention.

The imaging system 20 is a transmission X-ray system. In the example embodiment shown, the imaging system 20 comprises an apparatus 30 according to the invention for creating a corrected volume data set of an examination object 10. The apparatus 30 for creating a corrected volume data set is shown in an embodiment of the present invention with respect to FIG. 3 where it is further explained. The imaging system 20 can be embodied as a computed tomography apparatus or also as a mammography system. Here, the focus is on medical use. Alternatively, the imaging system 20 can also map non-living examination objects 10, for example an industrially manufactured workpiece, an item of baggage or the like.

In the example embodiment shown, the imaging system 20 has a radiation source 21 in the form of an X-ray tube for generating X-rays and a 2D detector 23. The latter is embodied to acquire X-rays that have passed through the examination object 10. The X-ray tube 21 is preferably embodied to generate a cone beam and/or a fan beam. For this purpose, the X-ray tube 21 preferably comprises a collimating apparatus for collimating the X-ray beam as desired. The 2D detector 23 is in particular embodied as a flat detector, i.e., the surface of its X-ray sensitive area is arranged in a plane. The 2D detector 23 can be embodied as a scintillation detector or also as a photon-counting X-ray detector. Here, the radiation source 21 and 2D detector 23 are arranged along a holding apparatus 26—in particular embodied as a so-called C-arm. The holding apparatus 26 can alternatively be embodied as a closed gantry. The holding apparatus 26 is embodied to move the radiation source 21 and the 2D detector 23 on a circular path about an axis of rotation R (here the z-axis of a reference coordinate system) about the examination object 10 during image data acquisition, thereby causing a relative movement between the examination object 10 and the emitter-detector pair. Alternative embodiments of the holding apparatus 26 are also possible, for example an embodiment in which the holding apparatus holds the emitter-detector pair in one position only or adjusts them along a line trajectory in which the two are aligned with one another. In some embodiments, including the one shown, the examination object 10 can be arranged on a support apparatus 28—such as a patient table or an object support plate. The support apparatus 28 is also part of the imaging system 20. The support apparatus can also be embodied to adjust the examination object 10 relative to the emitter-detector pair, for example the support apparatus can be embodied as rotatable (for example about the y-axis of the reference coordinate system) or tiltable. The support apparatus 28 can further be embodied as linearly adjustable, in particular horizontally. Combinations are also conceivable. In this way, the support apparatus 28 can generate a relative movement for the acquisition of a plurality of projection data sets even in the case of a fixed emitter-detector pair. The holding apparatus 26 and/or support apparatus 28 can be embodied to adjust the distance of the emitter-detector pair or the emitter 21 or the 2D detector 23 from the examination object 10 in each case and thereby adapt a magnification factor of the imaging system 20. When performing transmission X-ray imaging, preferably a plurality of projection data sets in the form of 2D X-ray transmission images, each representing the X-ray attenuation profile of the examination object 10 in the transmission direction or in the transmission region, can be created via the imaging system 20 in that, after passing through the examination object 10, the X-rays from the radiation source 21 impinge on the 2D detector 23 where they are acquired.

In some embodiments—including here—the apparatus 30 for creating a corrected volume data set of an examination object 10 is embodied as part of a control and monitoring apparatus 40 of the imaging system 20. The control and monitoring apparatus 50 comprises a data processing unit 50 embodied to generate control signals for the imaging system, for example for adjusting the holding apparatus 26 or for controlling the radiation source 21 or the like. The data processing unit 50 can further be embodied to acquire projection data sets of a transmission imaging examination and to generate a three-dimensional volume data set representing the examination object 10 based on a reconstruction rule. The control and monitoring apparatus 40 can further comprise a local storage apparatus 60 in which the fully reconstructed volume data set can be retrievably filed, for example by the apparatus 30.

The apparatus 30 can be in data communication with the data processing unit 50 and/or the storage apparatus 60 via the data interface 32. Further, the control and monitoring unit 60 can be in data communication with the imaging system 20, in particular with the 2D detector 28 or the holding apparatus 26 and/or the support apparatus 28 via the data interface 32.

Embodiments of the invention are briefly summarized once again below. The described embodiments of invention makes it possible to improve reduced image quality of 3D transmission X-ray imaging data sets based on misalignment/geometric discrepancies without the original projection data sets or the actual mapping geometry having to be available. Although only a fully reconstructed volume data set is available, the invention enables the application of the aforementioned correction algorithms that are commonly used prior to reconstruction. The generation of virtual projection data sets with the application of virtual mapping geometry eliminates the need to know the real projection data sets and the theoretical mapping geometry. This is replaced by virtual mapping geometry. In this way, any volume data sets, in particular volume data sets of unknown origin, old volume data sets or volume data sets from other manufacturers can be processed according to the invention and their image quality improved. According to an embodiment of the invention, pre-reconstruction corrections can be applied to post-reconstruction scenarios. The described workflow comprises re-projection of an initial volume data set using virtual mapping geometry. The virtual projection data sets generated in this way are then suitable for the application of a cost function based on a consistency condition for geometry optimization. This is followed by 3D reconstruction based on the optimized mapping geometry.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for creating a corrected volume data set representing an examination object, the computer-implemented method comprising:
    providing an initial volume data set based on unavailable projection data sets acquired via a transmission X-ray imaging system having an unknown real mapping geometry, the initial volume data set being a reconstructed three-dimensional data set that does not include projection data sets on which the three-dimensional data set is based;
    specifying virtual mapping geometry for the initial volume data set;
    generating a plurality of virtual projection data sets based on the initial volume data set and the virtual mapping geometry specified;
    generating corrected mapping geometry based on the plurality of virtual projection data sets; and
    generating the corrected volume data set based on the plurality of virtual projection data sets and the corrected mapping geometry.

2. The computer-implemented method of claim 1, wherein the specifying of the virtual mapping geometry comprises determining a value for each of a plurality of geometric parameters of the virtual mapping geometry.

3. The computer-implemented method of claim 2, wherein the determining of the value for at least one geometric parameter, of the plurality of geometric parameters of the virtual mapping geometry, is based on the initial volume data set.

4. The computer-implemented method of claim 3, wherein the determining of the value for at least one geometric parameter, of the plurality of geometric parameters of the virtual mapping geometry, is performed under an assumption of complete mapping of the examination object with the virtual mapping geometry.

5. The computer-implemented method of claim 3, wherein the determining of the value for at least one geometric parameter, of the plurality of geometric parameters of the virtual mapping geometry, is performed based on a technical specification of the transmission X-ray imaging system.

6. The computer-implemented method of claim 2, wherein the determining of the value for at least one geometric parameter, of the plurality of geometric parameters of the virtual mapping geometry, is performed under an assumption of complete mapping of the examination object with the virtual mapping geometry.

7. The computer-implemented method of claim 2, wherein the determining of the value for at least one geometric parameter, of the plurality of geometric parameters of the virtual mapping geometry, is performed based on a technical specification of the transmission X-ray imaging system.

8. The computer-implemented method of claim 2, wherein at least one geometric parameter, of the plurality of geometric parameters, is a parameter characterizing a virtual relative position between an X-ray source of the transmission X-ray imaging system and the examination object, of at least one of characterizing a virtual magnification the transmission X-ray imaging system or a virtual spatial resolution, or characterizing a number of virtual projection data sets.

9. The computer-implemented method of claim 2, wherein the generating of the plurality of virtual projection data sets includes projecting the initial volume data set according to the virtual mapping geometry.

10. The computer-implemented method of claim 2, wherein the generating of the corrected mapping geometry includes applying at least one cost function based on a consistency condition to the plurality of virtual projection data sets and the virtual mapping geometry.

11. The computer-implemented method of claim 2, wherein the generating of the corrected volume data set includes back-projecting the virtual projection data sets according to the corrected mapping geometry.

12. The computer-implemented method of claim 1, wherein the generating of the plurality of virtual projection data sets includes projecting the initial volume data set according to the virtual mapping geometry.

13. The computer-implemented method of claim 1, wherein the generating of the corrected mapping geometry includes applying at least one cost function based on a consistency condition to the plurality of virtual projection data sets and the virtual mapping geometry.

14. The computer-implemented method of claim 1, wherein the generating of the corrected volume data set includes back-projecting the virtual projection data sets according to the corrected mapping geometry.

15. The computer-implemented method of claim 1, wherein
    the generating the plurality of virtual projection data sets includes projecting the initial volume data set according to the virtual mapping geometry, the projection corresponding to a reverse operation of back projection, and
    the generating the corrected volume data set includes back-projecting the virtual projection data sets according to the corrected mapping geometry.

16. The computer implemented method of claim 1, wherein the specifying the virtual mapping geometry includes at least one of
    evaluating image information contained in the initial volume data set and deriving a corresponding parameter value, specifying the virtual mapping geometry based on at least one of an examination object or tissue material included in the initial volume data set, specifying the virtual mapping geometry based on at least one setting input by a user, or specifying the virtual mapping geometry based on a technical specification of the transmission X-ray imaging system.

17. An apparatus for creating a corrected volume data set representing an examination object based on an initial volume data set based on unavailable projection data sets acquired via a transmission X-ray imaging system having unknown real mapping geometry, the initial volume data set being a reconstructed three-dimensional data set that does not include projection data sets on which the three-dimensional data set is based, and the apparatus comprising:

a data interface configured to receive the initial volume data set; and a data processing unit configured to specify virtual mapping geometry for the initial volume data set, generate a plurality of virtual projection data sets based on the initial volume data set and the virtual mapping geometry specified, generate corrected mapping geometry based on the plurality of virtual projection data sets, and generate the corrected volume data set based on the plurality of virtual projection data sets and the corrected mapping geometry.

18. An imaging system comprising:

an apparatus for creating a corrected volume data set representing an examination object based on an initial volume data set, the initial volume data set being based on unavailable projection data sets acquired via a transmission X-ray imaging system having unknown real mapping geometry, and the initial volume data set being a reconstructed three-dimensional data set that does not include projection data sets on which the three-dimensional data set is based, and the apparatus including, a data interface configured to receive the initial volume data set, and a data processing unit configured to specify virtual mapping geometry for the initial volume data set, generate a plurality of virtual projection data sets based on the initial volume data set and the virtual mapping geometry specified, generate corrected mapping geometry based on the plurality of virtual projection data sets, and generate the corrected volume data set based on the plurality of virtual projection data sets and the corrected mapping geometry.

19. A non-transitory computer-readable storage medium storing readable and executable program sections for executing a computer-implemented method for creating a corrected volume data set representing an examination object when the program sections are executed by a data processing unit, the computer-implemented method comprising:

providing an initial volume data set based on unavailable projection data sets acquired via a transmission X-ray imaging system having an unknown real mapping geometry, the initial volume data set being a reconstructed three-dimensional data set that does not include projection data sets on which the three-dimensional data set is based;

specifying virtual mapping geometry for the initial volume data set;

generating a plurality of virtual projection data sets based on the initial volume data set and the virtual mapping geometry specified;

generating corrected mapping geometry based on the plurality of virtual projection data sets; and generating the corrected volume data set based on the plurality of virtual projection data sets and the corrected mapping geometry.

* * * * *